Jan. 6, 1970     W. T. ATKINSON     3,488,770
MEAT-LIKE PROTEIN FOOD PRODUCT
Filed March 7, 1969
WILLIAM T. ATKINSON
INVENTOR
BY Plumley, Tyner & Sundt
ATTORNEY United States Patent Office 3,488,770
Patented Jan. 6, 1970

3,488,770
MEAT-LIKE PROTEIN FOOD PRODUCT
William T. Atkinson, Minneapolis, Minn., assignor to Archer Daniels Midland Company, Minneapolis, Minn., a corporation of Delaware
Continuation-in-part of application Ser. No. 587,939, Aug. 17, 1966, which is a continuation-in-part of application Ser. No. 369,189, May 21, 1964. This application Mar. 7, 1969, Ser. No. 798,459
Int. Cl. A23i 1/14
U.S. Cl. 99—17         10 Claims

ABSTRACT OF THE DISCLOSURE

A hydratable food product is obtained by forming a protein mix of a proteinaceous material having a protein content of at least 30 percent, and preferably a solvent-extracted oil seed protein material, with 20–60 percent of water based on the weight of the protein mix, masticating this mix at temperatures substantially above the boiling point of water, and thereafter extruding this mix at elevated pressures and temperatures through an orifice into a medium of lower pressure and temperature.

---

This application is a continuation-in-part of application Ser. No. 587,939, filed Aug. 17, 1966, which in turn is a continuation-in-part of application Ser. No. 369,189, filed May 21, 1964, now abandoned.

The present invention relates to the production of meat-like food products from vegetable, fish, and similar protein sources. More particularly, the present invention relates to the production of protein structures having a texture and appearance very similar to muscle protein found in common meat products like steaks, fowl, chops, hams, and the like. The present invention further relates to a process for preparing meat-like protein products.

The preparation of meat-like food products from other protein sources has long been an aim of the food industry. Heretofore, food technologists have relied in many instances on the art developed in the production of synthetic fibers for the textile industry to produce meat-like products from other protein sources which simulate the fibrous chewing quality of meat. Thus, U.S. Patent No. 2,682,466, U.S. Patent No. 2,730,447, and related patents described the preparation of protein fibers by solution or colloidal dispersion of protein in an aqueous alkaline phase, passing such solution through a spinnerette and into an acid coagulating bath and recovering and stretching the resulting fibers. The stretching is required to impart toughness or chewiness to the product. The fibers are then coated with an edible binder which holds the fibers in place or causes them to adhere to each other. The final product is obtained by compounding the fibers into a tow which is then cut into suitable length and packaged.

In another method such as described in U.S. 2,830,902 and U.S. 2,813,025 and related patents, a solution of protein is formed which is then precipitated under agitation at elevated temperature by lowering the pH of the solution. The resulting precipitate may then be admixed with a binder and stirred into a uniform paste which can be shaped into any form desired, such as strands. The resulting strands are autoclaved with steam to give rise to the final product.

Both of these principal methods of preparing meat-like products from other protein sources suffer from a number of disadvantages. Thus, both methods require the protein to be in pure or substantially pure form and hence require a separation from available protein-containing materials. Furthermore, these processes require modifiers such as binders to simulate the texture of meat. Additionally, the resulting product is difficult to handle, package, and store. Another significant disadvantage of these prior art methods is the fact that most of the resulting meat-like products cannot be cooked without structural disintegration.

It is, therefore, an object of the present invention to provide a protein product of meat-like texture, appearance, and consistency.

It is a further object to produce such meat-like products from inexpensive proteinaceous raw materials.

It is a further object of the present invention to produce a protein product which can be readily packaged, stored, and sold without the use of sealed containers.

A particularly important object of the present invention is to provide a protein product in dehydrated form which does not disintegrate on contact with boiling water, and which, therefore, can be hydrated and on hydration by steaming or boiling has the texture, appearance, and coherence of cooked meat.

Other objects of the present invention will be apparent hereinafter.

The protein product of the present invention is obtained by the extrusion of moistened, proteinaceous material in the form of a plastic mass at elevated temperatures through an orifice into a medium of lower pressure to result in a porous, protein-containing product of plexilamellar structure which can also be characterized by its open cell structure in which a majority of cells have a length-to-width ratio of greater than one, the length being measured in the direction of extrusion and the width being measured in the transverse direction.

The protein extrudate of the present invention is a tough, resilient, dry to semi-dry, open celled, funicular structure made up of interlaced, interconnected funiculi of varying width and thickness. The majority of the cells defined by this plexilamellar protein structure are irregular in shape but are characterized by greater length in the direction of extrusion than average width as measured in the transverse direction. The extrudate thus obtained can be hydrated by cooking in hot aqueous systems such as boiling water. Such action will cause the extrudate to further expand and swell and give rise to a product having the texture, appearance, and coherence of cooked meat. The figure shows a photomicrograph of a section, cut in the machine direction, of the plexilamellar extrudate on hydration.

The process employed to form the plexilamellar protein of the present invention comprises, more specifically, admixing the protein-containing raw material with water to form a protein mix; masticating the protein mix at a temperature above 250° F., preferably at a temperature above 300° F., and under sufficient pressure to maintain the water in the protein mix and cause the formation of a plastic mass; causing unidirectional flow of such plastic mass; and then extruding the plastic mass through one or more flow-restricting orifices into a medium of lower pressure and temperature in which the water will be released as steam. The formation of the plastic mass constitutes one of the critical features of the described process to result in plexilamellar protein.

The term "plastic mass" as employed herein is meant to define a deformable, flowable material in which the protein is the continuous phase and in which the original particulate protein employed as the starting material can no longer be determined by visual microscopic examination. It is theorized that most protein-bearing materials contain the protein in encapsulated form and that protein therefore does not constitute the continuous phase. The shearing action in the masticating or plasticizing step of the present invention causes the cellular protein structure to be ruptured and the protein to be released as the continuous phase. In addition, the protein-water mixture in the process of being sheared is also subjected to unidirectional flow during the formation of the plastic mass. This is believed to cause orientation or alignment of the protein macromolecules and is believed to be, at least in part, responsible for the structure, hydratability, and chewability of the plexilamellar protein. Although a wide variety of equipment can be employed to accomplish the aforesaid process steps, it will be apparent that extruders of the type employed in the fabrication of thermoplastic resins are eminently suited to the process of the present invention. These extruders, comprising a heated barrel, a rotating screw within the barrel, and an extrusion die at the front end of the barrel, provide the necessary masticating action at the desired pressure and temperature to cause the formation of the plastic mass. The rotating screw builds up to the pressure required to cause the mass to flow unidirectionally and to push the plastic mass through the restricted orifice in the extrusion die, giving rise to the pressure differential across the die orifice required to cause the formation of the plexilamellar extrudate. The barrel in combination with the rotating screw creates, in effect, a closed chamber which prevents the release of the steam from the protein mix until it emerges from the die. As a result of the pressure differential across the die orifice, the steam is released and causes the expansion of the protein extrudate.

Although the following explanation of the unique properties of the plexilamellar protein is not to be considered as binding, it is given for a better understanding of the novel product of the present invention. Thus, it is believed that the tough, resilient structure of plexilamellar protein which allows it to be cooked for long periods of time without disintegration into mush is the result of two-fold orientation occurring in the extrusion. Thus, molecular orientation is induced when the protein mix is transformed into a plastic mass during mastication and when the resulting plastic mass is pushed through the orifice under pressure. Since the expansion of the extrudate on emergence from the die is not limited to the direction of flow, it will be apparent that the resulting extrudate may contain some multiaxial orientation and this may add to the cause of the unique properties of plexilamellar protein.

The process of the present invention is not limited to any particular type of protein. Any type of edible protein of vegetable, fish, or animal origin can be employed. The term "proteinaceous material" or "protein-containing material" as employed herein is intended to define an edible material having a protein content of at least 30% by weight. The protein can be employed in substantially pure form, in water-soluble form, or, as is preferred, in the form of flakes or flour, generically herein referred to as meal. Preferred proteinaceous materials are obtained by solvent extraction of oil seeds such as peanuts, cotton seeds, sesame seeds, or soybeans. Solvent extraction of oil seeds to remove oil and other fatty materials is well-known in the art and thus need not specifically be described. Removal of oils and fatty materials aids in the formation of products having the properties described for the plexilamellar protein of the present invention. The oil seed meals which have protein concentrations of 40 to 70% are preferred since they can be extruded into the plexilamellar product of the present invention over a broad range of conditions. Finely divided protein flour is less preferred because of its higher lubricity and its lesser tendency to shear and orientate. Although the proteinaceous material can be diluted with non-proteinaceous fillers such as cereals, wheat flour, or starches, such is not preferred since the addition of such materials in any significant concentrations, i.e. above 10%, interferes in the formation of a plexilamellar extrudate having superior rehydration properties. The protein concentration of the protein material to be extruded should, however, in any event, be maintained at a level above 30%, since otherwise the added filler will interfere in the formation of the continuous protein phase and its orientation in the masticating step.

The nature of the extrudate, for any given starting material, is principally governed by the concentration of water in the protein mix, the temperature to which the protein mix is heated during the extrusion, and the pressure developed in the extruder. The presence of water is essential for two reasons: it plasticizes the protein mix to form the necessary plastic mass, and it causes the expansion of the extrudate. It therefore follows that an increase in the concentration of water will result in greater plasticization and a higher degree of expansion. However, as is well-known, proteins contain water which is not released at the temperatures employed for extrusion and thus is unavailable for plasticization. The concentration of such nonreleasable water is not constant and increases with decreasing extrusion temperatures as well as with increasing protein concentrations in the protein mix fed to the extruder. It will also vary with the nature of the proteinaceous material employed. Hence, the minimum concentration of water necessary to obtain the formation of the plexilamellar extrudate will vary, but should be at least 10 to 15% above the nonreleasable water concentration. If the water concentration becomes too high, the fluidity of the protein mix is too high to allow the necessary shearing action during the masticating step. The resulting expansion may also cause a greater than desired cell structure. In general, the total concentration of water should be within the range of 20 to 60% by weight of the protein mix.

Since the expansion of the extrudate normally occurs at atmospheric pressure, the minimum temperature to which the protein mix must be heated in order to cause expansion of any degree is the boiling point of water, 212° F., in order to cause steam expansion of the extrudate. However, to produce a product having good stability in the presence of boiling water, it is desirable for the extrudate to emerge from the extruder at a temperature of at least 250° F. and preferably above 300° F. The application of a vacuum to the extrudate may, of course, allow the use of somewhat lower temperatures. Temperatures of at least 250° F., and preferably 300° F., are furthermore necessary in the mastication of the protein mix to form the desired plastic mass. The necessity of such temperature is not clearly understood, although it is believed that structural changes occur in the protein which allows it to assume a plastic flow.

An increase in the extrusion temperature, i.e. temperature of the protein mix during extrusion, other variables being maintained constant, will result in a more delicate funicular structure. The absolute upper limit of the extrusion temperature is dictated by the stability of the protein mix, and extrusion temperatures should not be so high as to cause substantial degradation of the protein or any additive being present. Since the physical structure of the product is affected by extrusion temperatures, the preferred temperatures are those which give rise to the desired structure. This is readily established experimentally. In general, the extrusion temperature is maintained within a range of 250 to 450° F. and preferably within a range of 300 to 400° F. The extrusion temperatures referred to are applicable to the plasticizing zone in the extruder and the die orifice.

The formation of the plastic mass from the protein mix and its extrusion into plexilamellar protein also requires sufficient pressure to maintain the plasticizer, i.e. the water, dispersed in the protein mix and also sufficient pressure to shear the protein particles and cause the protein to become the continuous phase. The pressure is also employed to cause the unidirectional flow of the plastic mass, i.e. flow through the helical path formed by the extruder screw and barrel, in the plasticizing section of the extruder and out of the extruder orifice. The use of minimal pressures, however, will not yield a product which is stable in boiling water. Thus, while it is possible to extrude with merely sufficient pressure to cause flow of the material through the barrel, substantially higher pressures are necessary to produce the required plexilamellar structure for extrudate which is stable in boiling water. The required pressure can be obtained by various means such as increasing the screw speed, decreasing the size of the orifice, or increasing the compression ratio of the screw.

Upper limits of pressure are generally dictated by the particular extrusion equipment employed. However, too high pressures result in the discontinuous extrudate caused by excessive shearing which is generally not desirable. The design of the extrusion orifice is a matter of choice and may vary from a slit or band orifice to a circular or square orifice. It should only be remembered that the extrusion orifice should not be so large that the extrusion equipment cannot produce the necessary pressure to cause the formation of plexilamellar protein. In general, the extrusion pressure as measured by the pressure drop across the orifice should be at least 100 p.s.i. and preferably in the range of about 250 to about 900 p.s.i.

In order to produce a commercially acceptable extrudate which can be rehydrated in hot water or steam while retaining a meat-like structure, it is necessary that both temperature and pressure be maintained well above the minimum levels which would be barely sufficient to cause extrusion through the orifice and steam expansion of the extrudate. In general, temperatures above 250° F., preferably above 300° F., and pressure within the extruder above 250 p.s.i., preferably above 500 p.s.i., will yield a satisfactory product. A reduction of either the temperature or the pressure to a lower level will have serious adverse effect upon the structure of the extrudate and its resultant ability to retain its form upon rehydration in hot water.

Various additives can be blended into the protein mix to improve its extrusion characteristics or to alter the nature of the hydrated extrudate with respect to texture, firmness, and cohesion. Thus, in general, the pH of the protein mix is adjusted to be within a range of 5.0 to 8.5 and preferably within a range of 6.5 to 7.5. At pH levels below 5.5, the extrusion becomes difficult in standard extrusion equipment in view of the reduced flow of the protein mix when transformed into a plastic mass. The hydrated extrudate furthermore may be too rubbery from the standpoint of chewing and too sour from the standpoint of taste. Increasing the pH from this low level results in increased tenderness. A pH level above 8.5 may result in a bitter taste, making the product unsuitable for consumption.

Sodium chloride can also be used as an additive. It is generally employed in concentrations of up to 3% based on the protein mix. The addition of sodium chloride also increases the firmness of the hydrated product and, thus, sodium chloride may be used to complement the effect of pH. However, addition of too much sodium chloride can result in poor extrusion.

A third valuable additive is a soluble calcium salt such as calcium chloride. Calcium ions act as crosslinking agents which bridge the protein intermolecularly as well as intramolecularly. This bridging is particularly desirable when the concentration of the protein-containing material of the composition to be extruded drops below 50%. The bridging improves the shearing action occurring during extrusion and expansion. Increased shear will result in a more fibrillated plexilamellar structure, resulting in a finer texture on hydration, and also will give rise to a higher degree of firmness and chewiness. In general, the concentration of the calcium salt should not exceed 3% of the protein mix.

It will be appreciated that various other flavoring and coloring additives normally added to meat-like protein products can also be added to the protein mix of the present invention prior to extrusion.

The plexilamellar extrudate emerges from the extruder as one or more continuous bands or strands. It is, in general, desirable to cut the extrudate into pellets or chunks for easier packaging, handling, or storing. Depending on the extrusion conditions employed, a substantially dry or slightly moist extrudate (e.g. having a total moisture content of about 15–30%) is obtained. From a standpoint of storage and transportability, it is desirable to dry the moist extrudate prior to packaging. In the dried state, the plexilamellar structure of the extrudate is compacted but not eliminated. The density of the dry product can range from 0.25 to 1.50 grams per cubic centimeter; more often, the density will be from 0.5 to 1.3 grams per cubic centimeter. The hydration of the plexilamellar extrudate is readily achieved by contact with water, preferably at elevated temperatures. Thus, the dried extrudate may be simmered or pressure-cooked in water, and readily swells and expands to result in a texture similar to that of cooked meat. The texture of the hydrated extrudate can be varied to assume the structures of known cooked meat products by changing the extrusion conditions, particularly extrusion temperatures, the pH of the protein mix, and the nature and amount of additives such as the sodium and calcium salts. Higher extrusion temperatures, lower pH, and addition of calcium chloride can change the texture of the hydrated product from that of cooked chicken meat to that of cooked beef.

The plexilamellar extrudate of the present invention is characterized by its ability to be rapidly and uniformly hydrated and its ability to absorb sufficient water to give it the chewiness and texture of cooked lean meat. The chewiness and texture of a coherent protein product is in part affected by its water content. It is, therefore, highly important that, in preparing the protein product for consumption, it contains enough water to reflect the chewiness of lean meat. A protein product containing too much water normally is too soft and mushy to resemble meat, whereas a protein product not containing enough water is normally too hard and either brittle or tough, depending on its preparative history. In preparing a cooked product from a dry or slightly moist protein product such as is produced in the present invention, it is necessary to hydrate the product. It is advantageous for the protein product to absorb a large quantity of water since the amount of water or other liquid absorbed adds directly to the weight of the hydrated product. The plexilamellar product of this invention retains its tough, meat-like texture even when it absorbs an amount of water equal to many times its own weight. The extent of water absorption is illustrated as the hydration ratio, by which is meant the weight ratio of the hydrated product to the product prior to hydration obtained by immersing a sample of the product in boiling water for 15 minutes. The plexilamellar protein products of the present invention have hydration ratios ranging from 2.0 to 8.5 and preferably in the range of 2.5 to 6.0. Ordinarily the hydration ratio will be from 2.5 to 3.5. In this range, the hydrated product exhibits the chewiness of lean meat.

It is likewise important that the protein product of this invention exhibit sufficient toughness to provide the mouth feel and chewiness of meat. An appropriate means of measuring this property is by determining the shear strength, i.e., the maximum stress the material can develop under the shearing forces. It is clear that chewing subjects the product to shear and the stress of the product determines, in large part, its similarity to meat. Of course, different types of meat have different resistances to shear; for example, steak can withstand a much greater shear than can hamburger or sausage. In this invention, the shear which the hydrated products can withstand ranges from 100 to 1500 pounds, more usually from 200 to 1000 pounds. Ordinarily, the shear force will be from 400 to 600 pounds.

The invention is further illustrated by the following examples in which all parts are by weight unless otherwise indicated.

EXAMPLE 1

The following components, listed in the order of their addition, were mixed in a ribbon blender at 120° F. for about 20 minutes:

11350 g. of extracted soybean flakes prepared according to U.S. Patent No. 3,100,709 by Twila M. Paulsen, issued Aug. 13, 1963, containing 50% soy protein and 6.5% moisture;
45 ml. of 50% hydrogen peroxide for purposes of flavor and odor control diluted in 380 ml. of water;
1700 g. of imitation beef seasoning;
3785 ml. of water;
90 g. of 97% pure sodium hydroxide; and
340 g. of calcium chloride dissolved in 500 ml. of water.

The resulting composition contained 30% moisture and 3% calcium chloride, and was extruded in a "Prodex" 1¾ inch extruder equipped with a medium compression screw and an extrusion die containing eight ³⁄₁₆ inch diameter orifices. The extruder was maintained at a temperature of 350° F. at the extrusion die and the front end of the barrel. The screw was rotated at the rate of 176 r.p.m.

The product expanded rapidly on emerging from the die while releasing steam. Substantially dry plexilamellar protein strands were obtained which were cut into 0.5 inch lengths by a rotating knife. The resulting product was autoclaved at 15 p.s.i. steam for 60 minutes. The hydrated product resembled beef in appearance and had firm and chewy eating characteristics.

EXAMPLE 2

The following components, listed in the order of their addition, were mixed in a ribbon blender at 120° F. for about 20 minutes:

11350 g. of the extracted soybean flakes of Example 1 containing 50% soy protein and 6.5% moisture;
3340 ml. of water;
35 g. of 97% pure sodium hydroxide; and
115 g. of sodium chloride dissolved in 600 ml. of water.

The resulting composition contained 30% moisture, had a pH of 6.5, and was extruded in the extruder described in Example 1. The extruder was maintained at a temperature of 250° F. at the extrusion die and the front end of the barrel. The screw was operated at 176 r.p.m. and the pressure developed at the front end of the extruder was 1750 p.s.i. The dried plexilamellar extrudate absorbed 3.65 g. of water per g. of dry extrudate, was white in color, fibrous in appearance, and resembled dried chicken meat. The hydrated, unflavored product was firm to slightly chewy and bland in flavor.

EXAMPLE 3

Employing the procedure of Example 2, a blend of the soy flakes of Example 1, 1% sodium chloride, 1% calcium chloride, and 30% moisture, having a pH of 6.15 was extruded at a temperature of 275° F. The extrudate was tough and strongly fibrillated. The dried product was simmered in water, retained its shape, and had a fibrous texture. Extrusion of the same material at 105° F. resulted in an unfoamed, soft, gel-like, amorphous extrudate which completely disintegrated on simmering in water.

EXAMPLE 4

Following the procedure of Example 2, a blend of a soy flake containing 70% soy protein, 1% sodium chloride, and 35% moisture, having a pH of 6.9, was extruded at 260° F. Steam evolution at the orifice caused considerable expansion and resulted in a plexilamellar extrudate. On simmering in water, the extrudate had a chewy, meat-like texture. Extrusion of the same composition at 140° F. resulted in a weak extrudate that was not expanded. The material completely cooked apart on simmering.

EXAMPLE 5

The soy flake composition of Example 1 containing 50% water was extruded at a temperature of 325° F. using the procedure of Example 2. Feed and extrusion were difficult to maintain continuously in view of the limitations of the equipment employed. The extrudate, however, was plexilamellar in structure and could be hydrated into a firm texture without disintegration.

EXAMPLE 6

The following components were employed in the amounts indicated to prepare the protein mix:

| Component | Amount |
|---|---|
| "Kaysoy 50A," commercially available soy flakes | lbs__ 233.0 |
| Chicken loaf seasoning | lbs__ 11.5 |
| Corn starch | lbs__ 2.5 |
| NaCl | lbs__ 2.0 |
| CaCl₂ | lbs__ 0.733 |
| NaOH, dry flakes, 97% | g__ 120.0 |
| Water | lbs__ 86.0 |

The soy flakes were transferred to a ribbon blender at 120° F. and blended with the slow addition of 60 lbs. of water. Upon complete addition of the water, blending was continued for 7 to 8 minutes. To the blend was then added the sodium hydroxide with additional blending for about 15 minutes. A solution of the calcium chloride in 26 lbs. of water was then added to the blend and mixing was continued for an additional 7 to 8 minutes. A crude mixture of the sodium chloride and the chicken loaf seasoning followed by the corn starch was then added. Mixing was then continued for an additional 15 minutes. The resulting protein mix was then cooled to room temperature.

The resulting protein mix was then extruded in a "Prodex" 1¾ inch extruder equipped with a medium compression screw and an extrusion die containing eight ³⁄₁₆ inch diameter orifices. The temperature of the protein mix in the feeding zone of the extruder was maintained at 300 to 305° F. by heating the extruder barrel to 200° F. The temperature of the protein mix in the plasticizing zone was maintained at 320 to 330° F. by maintaining the extruder barrel at 320° F. The extrusion die was maintained at 310° F. The extruder screw was operated at maximum speed to result in a pressure of 550 p.s.i. in the plasticizing zone and a pressure at the entrance of the die of 300 p.s.i. The continuous plexilamellar protein extrudate was cut into chunks by a rotating cutter. The extrudate exhibited a hydration ratio of 3.75.

Similar results are obtained if instead of the soy flakes used in the foregoing examples a soy protein obtained by isoelectric point precipitation of protein solubilized from soy flakes, whale flour produced by the solvent extraction of whale meat, solvent extracted peanut meal, ground nut meal, cottonseed meal, or commercial casein is employed.

As illustrated in the foregoing examples, the hydrated plexilamellar protein of the present invention has the texture, appearance, and eating characteristics of cooked meat. Plexilamellar protein is readily produced on a continuous basis and can be packaged, handled, and stored in the dry form without requiring canning. On hydration, the product can be boiled, fried, roasted, and/or steamed without loss of shape or texture. The versatility of the process of the present invention allows the formation of a wide variety of edible products of differing texture without destroying the unique characteristic of the product of the present invention; namely, its similarity in texture to cooked meat and its retention of texture and shape on hydration. The flexibility of the process of the present invention also allows the addition of modifiers without changing the basic nature of the product. It is eminently suited for the conversion of inexpensive, impure proteins, e.g. soy meal, into highly attractive meat-like products of high nutritional value.

From the foregoing description of specific embodiments of the present invention, numerous modifications and alterations will be apparent to those skilled in the art, and it is intended that such be included within the scope of the present invention.

What is claimed is:

1. An expanded food product comprising a solvent-extracted oil seed proteinaceous material having a protein concentration of at least 30 percent, substantially free of non-proteinaceous fillers and having an open cell structure, in which the majority of the cells have cell dimensions of greater length than average width, the length of said cells being substantially aligned.

2. An expanded food product consisting essentially of a solvent-extracted oil seed proteinaceous material having protein concentrations of at least 40 percent and having an open cell structure in which the majority of the cells have cell dimensions of greater length than average width, the length of said cells being substantially aligned, and a hydration ratio in the range of 2.0 to 8.5.

3. The expanded food product of claim 1 wherein the oil seed proteinaceous material is a solvent-extracted soybean material.

4. The expanded food product of claim 1 wherein the solvent-extracted oil seed proteinaceous material has a protein concentration of 40–70 percent by weight.

5. The expanded food product of claim 1 containing from 50 to 88% by weight of the product of water.

6. An expanded food product comprising a solvent-extracted oil seed proteinaceous material having a protein concentration of at least 30 percent, being substantially free of non-proteinaceous fillers having a plexilamellar structure defining open cells of irregular shape, a majority of which have greater length than average width and are substantially aligned, and being characterized by its meat-like chewiness and texture after hydration in boiling water for about 15 minutes and a hydration ratio in the range of 2.0 to 8.5.

7. Product of claim 6 wherein said oil seed is soy bean.

8. A tough, resilient, dry to semi-dry expanded food product comprising a solvent-extracted soy bean material having a protein concentration of at least 40 percent, being substantially free of non-proteinaceous fillers, and having an open-celled structure made up of interlaced, interconnected funiculi of varying width and thickness, said funiculi defining the outlines of the substantially aligned open cells, a majority of which have greater length than average width.

9. The product of claim 8 having a protein concentration of 40 to 70 percent.

10. A food product having the texture, appearance and coherence of cooked meat comprising the hydrated product of claim 8.

References Cited

UNITED STATES PATENTS

| 2,791,508 | 5/1957  | Rivoche         | 99—131 |
| 3,047,495 | 7/1962  | Rusoff et al.   | 99—14  |
| 3,102,031 | 8/1963  | MacAllister et al. | 99—14 |
| 3,114,639 | 12/1963 | Rivoche         | 99—100 |
| 3,119,691 | 1/1964  | Ludington et al. | 99—2  |
| 3,139,342 | 6/1964  | Linskey         | 99—2   |
| 3,142,571 | 7/1964  | McAnelly        | 99—14  |
| 3,150,978 | 8/1964  | Campfield       | 99—1   |

A. LOUIS MONACELL, Primary Examiner

W. A. SIMONS, Assistant Examiner